United States Patent
Joung et al.

(10) Patent No.: US 9,066,340 B2
(45) Date of Patent: Jun. 23, 2015

(54) METHOD OF DETECTING PHYSICAL DOWNLINK CONTROL CHANNEL IN LONG-TERM EVOLUTION SYSTEM

(71) Applicant: INNOWIRELESS CO., LTD., Seongnam-si (KR)

(72) Inventors: Jinsoup Joung, Seongnam-si (KR); Seunghwan Ji, Seongnam-si (KR); Yonghoon Lim, Seoul (KR); Seungik Yang, Seoul (KR); Soocheol Kyeong, Cheongju-si (KR)

(73) Assignee: INNOWIRELESS CO., LTD. (KR)

( * ) Notice: Subject to any disclaimer, the term of this patent is extended or adjusted under 35 U.S.C. 154(b) by 150 days.

(21) Appl. No.: 13/799,199

(22) Filed: Mar. 13, 2013

(65) Prior Publication Data
US 2014/0023000 A1 Jan. 23, 2014

(30) Foreign Application Priority Data
Jul. 20, 2012 (KR) ........................ 10-2012-0079596

(51) Int. Cl.
| | | |
|---|---|---|
| *H04W 4/00* | (2009.01) | |
| *H04W 72/04* | (2009.01) | |
| *H04L 5/00* | (2006.01) | |
| *H04L 1/00* | (2006.01) | |
| *H04W 48/12* | (2009.01) | |

(52) U.S. Cl.
CPC ............ *H04W 72/042* (2013.01); *H04W 48/12* (2013.01); *H04L 5/0053* (2013.01); *H04L 1/0045* (2013.01)

(58) Field of Classification Search
CPC .. H04W 72/042; H04W 48/12; H04L 5/0007; H04L 5/0094; H04L 5/0076; H04L 5/0055; H04L 5/0053; H04L 5/00
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | |
|---|---|---|---|
| 2013/0003569 A1* | 1/2013 | Lindoff et al. ................ | 370/252 |
| 2013/0058240 A1* | 3/2013 | Kim et al. .................... | 370/252 |
| 2013/0223366 A1* | 8/2013 | Papasakellariou et al. ... | 370/329 |

* cited by examiner

*Primary Examiner* — Jung-Jen Liu
(74) *Attorney, Agent, or Firm* — Cantor Colburn LLP

(57) ABSTRACT

Disclosed herein is a method of detecting a physical downlink control channel (PDCCH) in a long-term evolution (LTE) system. In this method, one is selected from among possible PDCCH formats for received base station signals, and a signal corresponding to the length of the selected PDCCH format is retrieved. Thereafter, one is selected from among one or more of possible DCI formats that have not been selected yet. Thereafter, decoding is performed using the retrieved signal and the selected DCI format. Finally, a remainder is obtained by dividing the decoded signal by a cyclic redundancy check (CRC) pattern, and the remainder is stored as RNTI information, along with the selected DCI and the DCI format.

5 Claims, 7 Drawing Sheets

FIG. 4
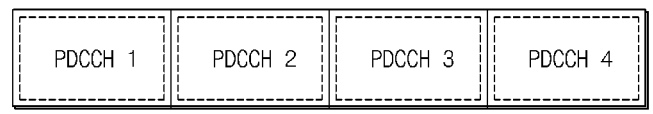
(Common space, detect PDCCH format2)
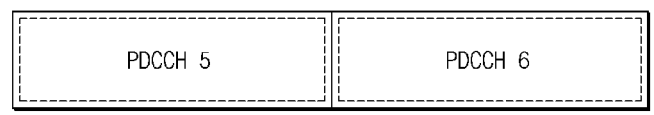
(Common space, detect PDCCH format3)

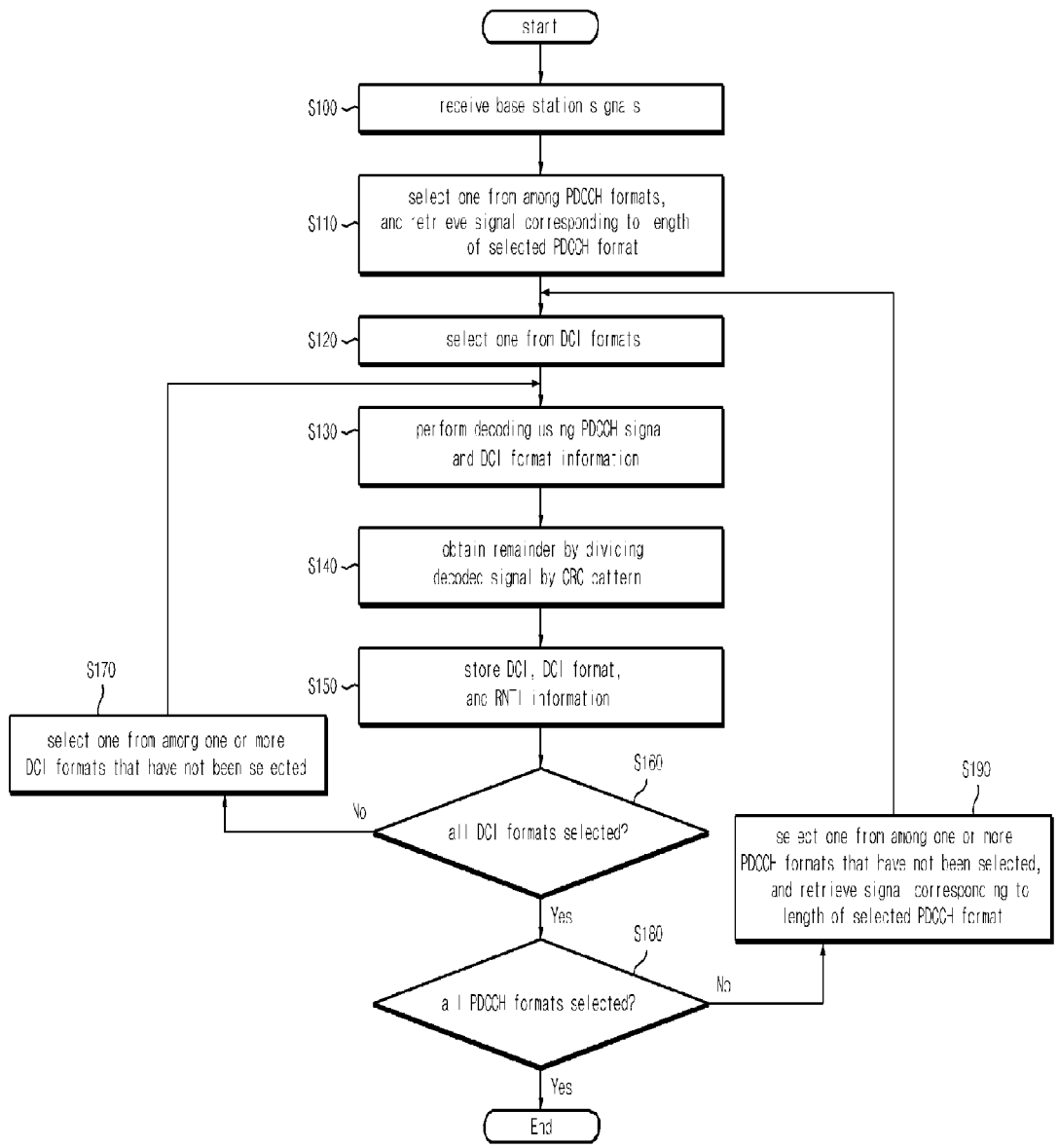

METHOD OF DETECTING PHYSICAL DOWNLINK CONTROL CHANNEL IN LONG-TERM EVOLUTION SYSTEM

BACKGROUND OF THE INVENTION

1. Field of the Invention

The present invention relates generally to a method of detecting a physical downlink control channel (PDCCH) in a long-term evolution (LTE) system and, more particularly, to a method of detecting a PDCCH in an LTE system that is capable of reducing computational load that is required to detect downlink control information (DCI) from a PDCCH allocated to a common space when detecting the DCI at a receiving end, thereby enabling overall DCI to be rapidly detected.

2. Description of the Related Art

In an LTE system, downlink signals may be classified into a PDCCH and a data signal. User equipment (UE) receives downlink signals from a base station, and then uses DCI, obtained by decoding a PDCCH, to detect a data signal or to control uplink transmission.

FIG. 1 is a diagram illustrating the structure of the PDCCH and data signal of LTE downlink signals. As illustrated in FIG. 1, the PDCCH and the data signal are located in different regions in terms of time within a sub-frame, that is, the transmission time interval (TTI) of downlink signals.

FIG. 2 is a block diagram illustrating a process in which DCI in a binary number form is modulated into a PDCCH in a complex number form within LTE downlink signals. As illustrated in FIG. 2, DCI used in the LTE system standard is converted into a PDCCH through encoding, scrambling and symbol mapping, is allocated to a resource in the control region of a sub-frame, and is then transmitted.

In detail, a plurality of pieces of DCI may be multiplexed into a single signal and then transmitted. The reason for this is that a single piece of DCI can control only a single function in an LTE system. That is, to control various functions through a single downlink signal transmission, a plurality of pieces of DCI should be transmitted at the same time. The types of DCI of the LTE system and the functions that are controlled by the types of DCI are summarized in the following Table 1:

TABLE 1

| DCI format | Function |
| --- | --- |
| DCI 1, DCI 1A, DCI 1B, DCI 1C, DCI 1D, DCI 2, DCI 2A, DCI 2B, DCI 2C | downlink data signal detection information |
| DCI 0, DCI 3, DCI 3A, DCI 4 | uplink data signal transmission control information |
| DCI 1A | uplink random access procedure information |

Meanwhile, to detect a downlink data signal, DCI in a unique format is used in accordance with the transmission technique that is used to transmit the data signal. When uplink data signal transmission is controlled, DCI in a unique format is used in accordance with the technique that transmits an uplink data signal, and DCI indicative of uplink transmission power information is distinguished by a unique format. Downlink data signals are also distinguished by their various purposes. Accordingly, information is additionally required to distinguish the purposes of downlink data signals. In the LTE system, a radio network temporary identifier (RNTI) of 16 bits is defined, and used to distinguish the purposes of data signals. In the LTE system, the types and purposes of RNTIs are summarized in the following Table 2:

TABLE 2

| Type of RNTI | Purpose |
| --- | --- |
| P-RNTI | paging, checking of variations in system information |
| SI-RNTI | broadcast transmission of system information |
| M-RNTI | checking of variations in MCCH information |
| RA-RNTI | transmission of response of random access |
| Temporary C-RNTI | contention resolution, Msg3 transmission |
| C-RNTI | dynamically scheduled unicast transmission |
| SPS C-RNTI | semi-persistently scheduled unicast transmission |
| TPC-PUCCH-RNTI | physical layer power control |
| TPC-PUSCH-RNTI | physical layer power control |

According to the above Table 2, the DCI of a specific function is determined based on DCI format information and RNTI information. All of the possible combinations of DCI format information and RNTI information that determine DCI are summarized in the following Table 3:

TABLE 3

| DCI format | Type of RNTI to be combined |
| --- | --- |
| DCI 0, 1 | C-RNTI, SPS C-RNTI, Temporary C-RNTI |
| DCI 1A | SI-RNTI, P-RNTI, RA-RNTI, C-RNTI, SPS C-RNTI, Temporary C-RNTI |
| DCI 1B, 1D | C-RNTI |
| DCI 1C | SI-RNTI, P-RNTI, RA-RNTI, M-RNTI |
| DCI 2, 2A, 2B, 2C | C-RNTI, SPS C-RNTI |
| DCI 3/3A | TPC-PUCCH-RNTI, TPC-PUSCH-RNTI |
| DCI 4 | C-RNTI |

Once the DCI format has been determined as described above, the DCI of the determined format is formed, and then 16-bit Cyclic Redundancy Check (CRC) information (hereinafter referred to as "pure CRC information"), obtained using the CRC pattern of the LTE standard in the form of a 16-th polynomial, is affixed to the rear end of DCI in order to detect errors prior to encoding. RNTI information is included by performing an XOR operation on the 16-bit pure CRC information added at the process of affixing CRC information and 16-bit RNTI information (hereinafter a portion in which the RNTI information has been included in the pure CRC information is referred to as the "CRC information including an RNTI"). After the process of affixing the pure CRC information and the RNTI information to each other has been completed, convolutional encoding is performed. During rate matching that is performed after the encoding, the DCI is deformed to a PDCCH, in which case the output length is determined by PDCCH format information. Such PDCCH format information is listed in the following Table 4:

TABLE 4

| PDCCH Formats | Number of PDCCH Bits |
| --- | --- |
| 0 | 72 |
| 1 | 144 |
| 2 | 288 |
| 3 | 576 |

Thereafter, a PDCCH is generated using the DCI determined based on the DCI format, the DCI, the RNTI information and the PDCCH format information. The PDCCH in a binary number form, generated through the above process, is converted into a complex number form through scrambling and symbol mapping, is allocated to a resource within a sub-frame, and is then transmitted.

Meanwhile, a PDCCH including DCI that is used in common by all UEs within the coverage area of a base station is allocated to a resource region defined as a common space, and a PDCCH including DCI that is used only by specific UE is allocated to a resource region defined as a UE-specific space. The PDCCHs that may be allocated to common and UE-specific spaces may be distinguished based on RNTI, as shown in the following Table 5:

TABLE 5

| Resource Allocated Region | RNTI | PDCCH Size (bits) |
| --- | --- | --- |
| Common space | SI-RNTI, P-RNTI, RA-RNTI, C-RNTI, SPS C-RNTI, M-RNTI, Temporary C-RNTI, TPC-PUCCH-RNTI, TPC-PUSCH-RNTI | 72, 144, 288, 576 |
| UE-specific space | C-RNTI, SPS C-RNTI, Temporary C-RNTI | 288, 576 |

When physical downlink control channels (PDCCHs) are allocated to the common space, the common space is allocated sequentially from the front of a control region. In contrast, when PDCCHs are allocated to the UE-specific space, an allocated location varies depending on selected RNTI information and a current sub-frame number.

Meanwhile, the UE receives base station signals, detects a PDCCH therefrom, and decodes DCI based on the PDCCH. In the process of detecting the PDCCH, the UE cannot be aware of the location of a resource to which the PDCCH has been allocated, and cannot be aware of the PDCCH format, that is, the size of the PDCCH, at the allocated location. In this situation, to correctly detect the PDCCH transmitted by the base station, the UE should find the location of the control region to which the PDCCH transmitted by the base station has been allocated, and the size of the PDCCH.

The UE attempts to detect the signal while taking into consideration all combinations of information about the location to which the PDCCH has been allocated, the DCI format information, the RNTI type and the PDCCH format information in the state in which the UE cannot be aware of the four types of information. Meanwhile, the PDCCH formats that can be allocated to the common space and the UE-specific space, that is, resource Allocated Regions, and the number of PDCCH formats have been determined, and are shown in the following Table 6:

TABLE 6

| Type of Allocated Region | PDCCH Formats (bits) | Number of PDCCHs that can be allocated |
| --- | --- | --- |
| UE-specific space | 0 (72) | 6 |
| | 1 (144) | 6 |
| | 2 (288) | 2 |
| | 3 (576) | 2 |
| Common space | 2 (288) | 4 |
| | 3 (576) | 2 |

Referring to Tables 3, 5 and 6 in a collective manner, the DCI formats, the RNTI types, the PDCCH formats and the number of PDCCH formats that can be allocated for specific resource allocation can be found. For example, according to Table 3, DCI format 1A may form a PDCCH in combination with a P-RNTI. According to Table 5, a PDCCH including a P-RNTI is allocated to the common space. Finally, according to Table 6, PDCCHs allocated to the common space may have PDCCH formats 2 and 3, and PDCCHs whose number is defined for each format may be allocated.

Based on the above description, the base station transmits a PDCCH based on a specific combination of a DCI format, an RNTI type, a PDCCH format and a resource Allocated Region. The UE receives this signal, and attempts to detect a signal with respect to all possible combinations of the PDCCH. If the signal is detected based on a specific combination and the results of decoding are determined to have no error after a CRC, it is determined that DCI related to the combination has been transmitted, and the decoded binary signal is used as the DCI.

The combinations that the UE should take into consideration to detect a PDCCH may be summarized in the following Table 7:

TABLE 7

| Allocated region | DCI Format | Type of RNTI to be combined | PDCCH formats (maximum number of allocated formats) |
| --- | --- | --- | --- |
| Common space | DCI 1 | C-RNTI, Temporary C-RNTI, SPS C-RNTI | 2 (4) |
| | DCI 1A | SI-RNTI, P-RNTI, RA-RNTI, C-RNTI, SPS C-RNTI, Temporary C-RNTI | 3 (2) |
| | DCI 1C | SI-RNTI, P-RNTI, RA-RNTI, M-RNTI | |
| | DCI 3 | TPC-PUCCH-RNTI, TPC-PUSCH-RNTI | |
| | DCI 3A | TPC-PUCCH-RNTI, TPC-PUSCH-RNTI | |
| UE-specific space | DCI 0 | C-RNTI, SPS C-RNTI | 0 (6) |
| | DCI 1 | C-RNTI, SPS C-RNTI, Temporary C-RNTI | 1 (6) |
| | | | 2 (2) |
| | DCI 1A | C-RNTI, SPS C-RNTI, Temporary C-RNTI | 3 (2) |
| | DCI 1B | C-RNTI | |
| | DCI 1D | C-RNTI | |
| | DCI 2 | C-RNTI, SPS C-RNTI | |
| | DCI 2A | C-RNTI, SPS C-RNTI | |
| | DCI 2B | C-RNTI, SPS C-RNTI | |
| | DCI 2C | C-RNTI, SPS C-RNTI | |
| | DCI 4 | C-RNTI | |

When PDCCHs are assigned to the common space, the common space is assigned sequentially from the front of a control region. For example, when PDCCH1 including DCI format 1C, a P-RNTI and PDCCH format 2 and PDCCH2 including DCI format 1A, a C-RNTI and PDCCH format 2 are allocated to the common space, PDCCH1 is allocated to a region extending from the front of a control region by the length of PDCCH format 2, and then PDCCH2 is allocated subsequently. FIG. 3 is a block diagram illustrating a process in which PDCCHs are assigned to the common space.

In contrast, when PDCCHs are assigned to the UE-specific space, a location allocated an RNTI value varies. That is, when a plurality of PDCCHs including different RNTIs are allocated, the plurality of PDCCHs is not sequentially allocated because of allocated locations that are determined depending on the RNTIs.

In this process, the UE receives signals from the base station, and detects a PDCCH. In this case, the UE cannot find Allocated Region information, DCI format information, RNTI information and PDCCH format information with the PDCCH that is generated by the base station. Accordingly, the UE detects the PDCCH through the following process.

FIG. 4 is a diagram illustrating a process of attempting a PDCCH in the common space. In FIG. 4, PDCCHs, in each of which possible DCI formats and RNTI information are combined, may be located at the locations of PDCCH1 to PDCCH6. Since 17 combinations of DCI formats and RNTIs are possible for the common space in accordance with Table 7 and six CRCs are required for each of the combinations, as illustrated in FIG. 4, a total of 102 CRCs should be performed for the UE to detect the PDCCH in the common space.

FIG. 5 is a flowchart illustrating a conventional method of detecting a PDCCH in an LTE system. As illustrated in FIG. 5, in accordance with the conventional method of detecting a PDCCH in an LTE system, first, base station signals are received at step S10, in which case it is assumed that a PDCCH has been allocated to a common space.

In this state, at step S15, one is selected from among possible PDCCH formats, and a signal corresponding to the length of the selected PDCCH format is retrieved from the common space.

Thereafter, at step S20, one is selected from among possible DCI formats, and at step S25, decoding is performed using the signal retrieved at step S15 and the DCI format information selected at step S20. Thereafter, at step S30, one is selected from among possible pieces of RNTI information, and at step S35, a CRC is performed after the RNTI information has been eliminated from CRC information including an RNTI. In a CRC process, when the signal that has undergone decoding and RNTI information elimination is divided by a CRC pattern, the decoding is determined to be successful if the remainder is 0, and the decoding is determined to fail if the remainder is not 0.

Thereafter, at step S40, it is determined whether the decoding is successful. If the decoding is successful, these pieces of information, that is, the DCI obtained when the decoding is successful and the DCI format and the RNTI information at the time, are stored at step S75 and then step S45 is performed in order to perform a control function corresponding to the corresponding combination of the DCI format and the RNTI information. In contrast, if the decoding is not successful, step S45 is immediately performed without the storage of any information. At step S45, it is determined whether all of the RNTIs have been selected. If, as a result of the determination at step S45, not all of the RNTIs have been selected, the process proceeds to step S50, where one is selected from among one or more RNTIs that have not been selected yet, and then returns to step S35. In contrast, if all of the RNTIs have been selected, the process proceeds to step S55, where all of the DCI formats have been selected.

If, as a result of the determination at step S55, not all of the DCI formats have been selected, the process proceeds to step S50, where one is selected from among one or more DCI formats that have not been selected yet, and then returns to step S25. In contrast, if all of the DCI formats have been selected, the process proceeds to step S65, where it is determined whether all of the PDCCH formats have been selected.

If, as a result of the determination at step S65, all of the PDCCH formats have been selected, the process ends. In contrast, if not all of the PDCCH formats have been selected, the process proceeds to step S70, where one is selected from among one or more PDCCH formats that have not been selected yet and a signal corresponding to the length of the selected PDCCH format is retrieved, and then returns to step S20.

After the PDCCH has been detected in the common space as described above, it is assumed that a PDCCH has been allocated to the UE-specific space, and the above-described process of FIG. 5 is performed. Unlike in the case of UE-specific space allocation in which a location to which a PDCCH is allocated is variable because of an RNTI value, allocation is performed sequentially from the front of the space in common space allocation.

In accordance with Table 7, in the common space, DCI format 0 may be combined with three types of RNTI information, DCI format 1A may be combined with six types of RNTI information, and DCI format 1C may be combined with four types of RNTI information. In the same manner, DCI format 3 may be combined with two types RNTI information, and DCI format 3A may be combined with two types of RNTI information. Accordingly, since a total of 17 combinations of DCI formats and RNTIs are possible and six CRCs are performed for each of the combinations, as illustrated in FIG. 4, a total of 102 (=17×6) CRCs, that is, an excessive number of tests, are required. Accordingly, the conventional method has the problems of an excessive amount of computational load and an excessively long test time.

SUMMARY OF THE INVENTION

Accordingly, the present invention has been made keeping in mind the above problems occurring in the prior art, and an object of the present invention is to provide a method of detecting a PDCCH in an LTE system that is capable of reducing computational load that is required to detect downlink control information (DCI) from a PDCCH allocated to a common space when detecting the DCI at a receiving end, thereby enabling entire DCI to be rapidly detected.

In order to accomplish the above object, the present invention provides a method of detecting a PDCCH in an LTE system, including step (a) of selecting one from among possible PDCCH formats for received base station signals, and retrieving a signal corresponding to the length of the selected PDCCH format; step (b) of selecting one from among one or more of possible DCI formats that have not been selected yet; step (c) of performing decoding using the signal retrieved at step (a) and the DCI format selected at step (b); and step (d) of obtaining a remainder by dividing the signal decoded at step (c) by a cyclic redundancy check (CRC) pattern, and storing the remainder as RNTI information, together with the selected DCI and the DCI format.

The method may further include step (e) of repeating steps (b) to (d) until all of the possible DCI formats have been selected.

The method may further include step (f) of repeating steps (a) to (f) until all of the possible PDCCH formats have been selected.

The PDCCH may be a PDCCH that has been allocated to a common space.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram illustrating a process of attempting a PDCCH in a common space;

FIG. 7 is a flowchart illustrating a method of detecting a PDCCH in an LTE system in accordance with the present invention.

DESCRIPTION OF THE PREFERRED EMBODIMENTS

Embodiments of a method of detecting a PDCCH in an LTE system in accordance with the present invention will be described in detail.

Figure 6:
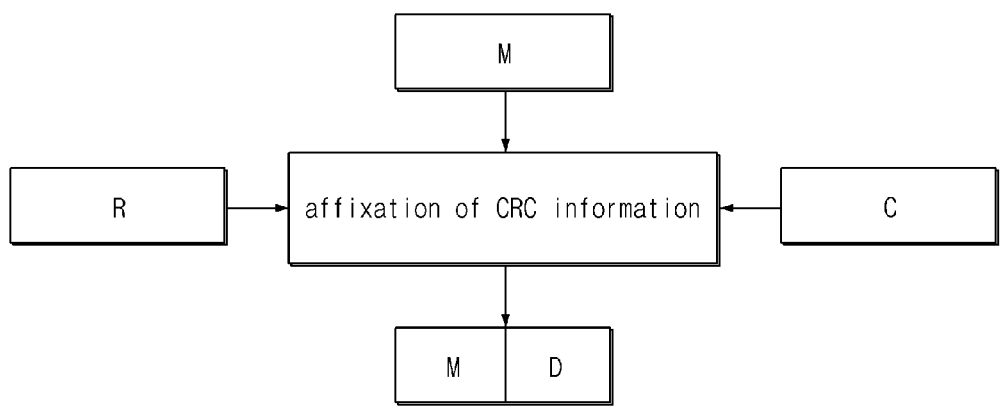
FIG. 6 is a diagram illustrating inputs and outputs in a process of affixing CRC information.

FIG. 6 is a diagram illustrating inputs and outputs in a process of affixing CRC information. As illustrated in FIG. 6, when DCI is set to "M," a CRC pattern is set to "C" and RNTI information is set to "R," inputs and outputs in the process of affixing CRC information are as illustrated in FIG. 6. Here, "D" denotes CRC information including an RNTI that is obtained by performing an XOR operation on lower 16-bit CRC information generated in the process of affixing CRC information via "C" and 16-bit RNTI information "R."

A binary number XOR operation $\oplus$ has characteristics with respect to binary numbers V and W, as illustrated in the following Equation 1:

$$(V \oplus W) \oplus V = W, (V \oplus W) \oplus W = V \quad (1)$$

When XOR operations are performed on an output signal decoded at a receiving end and 16-bit RNTI information using the above Equation 1, RNTI information is eliminated. In the conventional method, CRCs are performed thereafter. In a CRC process, when the signal that has undergone decoding and RNTI information elimination as described above is divided by a CRC pattern, the decoding is determined to be successful if the remainder is 0, and the decoding is determined to fail if the remainder is not 0. In contrast, if a CRC is performed without the performance of XOR operations related to the RNTI information in the above RNTI information elimination and CRC process, the remainder is not 0 and the RNTI information is not eliminated but remains, even when there is no error in the test process.

Based on the above characteristics, when decoding, the omission of RNTI elimination and a CRC test are sequentially performed on different PDCCHs, that is, PDCCH_X, PDCCH_Y, and PDCCH_Z, having the same DCI format and PDCCH format and including different pieces of RNTI information, that is, RNTI_X, RNTI_Y, and RNTI_Z, remainder RNTI_X is obtained for PDCCH_X as a result of the CRC test, remainder RNTI_Y is obtained for PDCCH_Y as a result of the CRC test, and remainder RNTI_Z is obtained for PDCCH_Z as a result of the CRC test.

That is, if the remainder value is the same as specific RNTI information after a receiving end does not perform the elimination of RNTI information before the CRC test but instead directly performs the CRC test, the remainder value obtained in the CRC test is determined to be the RNTI information used, and, at the same time, the decoding is determined to be successful. For example, it is assumed that the receiving end should take into consideration 10 pieces of RNTI information with regard to a specific DCI format and PDCCH format environment. The existing method should perform decoding related to the assumed DCI format and PDCCH format, and then perform RNTI elimination and a CRC test on 10 different pieces of RNTI information. In contrast, the present invention omits the RNTI elimination process, and determines whether there are values that are the same as 10 RNTI values using the remainder value obtained after the CRC test. Accordingly, the 10 pieces of RNTI information can be tested only with a single CRC test.

As a result, since allocated locations have no connection with RNTI information in the common space, the fast PDCCH detection method of the present invention may be applied to the total of six test regions of FIG. 4. In contrast, since a signal allocated location is dependent on RNTI information in the UE-specific space, the method of the present invention is not applied to a signal at a specific location.

FIG. 7 is a flowchart illustrating a method of detecting a PDCCH in an LTE system in accordance with the present invention. As illustrated in FIG. 7, in the method of detecting a PDCCH in an LTE system in accordance with the present invention, first, base station signals are received at step S100, in which case it is assumed that a PDCCH has been allocated to a common space.

In this state, at step S110, one is selected from among possible PDCCH formats, and a signal corresponding to the length of the selected PDCCH format is retrieved from the common space.

Thereafter, at step S120, one is selected from among possible DCI formats, and at step S130, decoding is performed using the signal retrieved at step S110 and the DCI format information selected at step S120. The process up to step S130 is the same as the corresponding process illustrated in FIG. 5.

Meanwhile, at step S140, a CRC test is immediately performed without eliminating RNTI information from CRC information including an RNTI, unlike in the conventional method. That is, a remainder is obtained by dividing the decoded signal by a CRC pattern. At step S150, in order to perform a control function corresponding to the combination of the DCI format and the RNTI information, the remainder obtained at step S140 is stored as corresponding RNTI information, along with the selected DCI and its DCI format.

Thereafter, at step S160, it is determined whether all of possible DCI formats have been selected. If not all of the DCI formats have been selected, the process proceeds to step S170, where one is selected from among one or more DCI formats that have not been selected yet, and then returns to step S130. In contrast, if all of the DCI formats have been selected, the process proceeds to step S180, where it is determined that all of the PDCCH formats have been selected.

If, as a result of the determination at step S180, all of the PDCCH formats have been selected, the process ends. If not all of the PDCCH formats have been selected, the process proceeds to step S190, where one is selected from among one or more PDCCH formats that have not been selected yet and a signal corresponding to the length of the selected PDCCH format is retrieved, and then returns to step S120.

Figure 1:
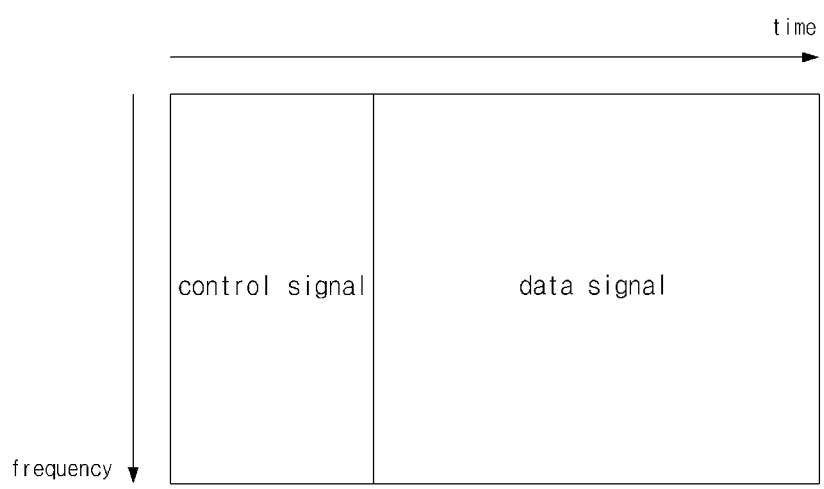
FIG. 1 is a diagram illustrating the structure of the PDCCH and data signal of LTE downlink signals.
Figure 2:
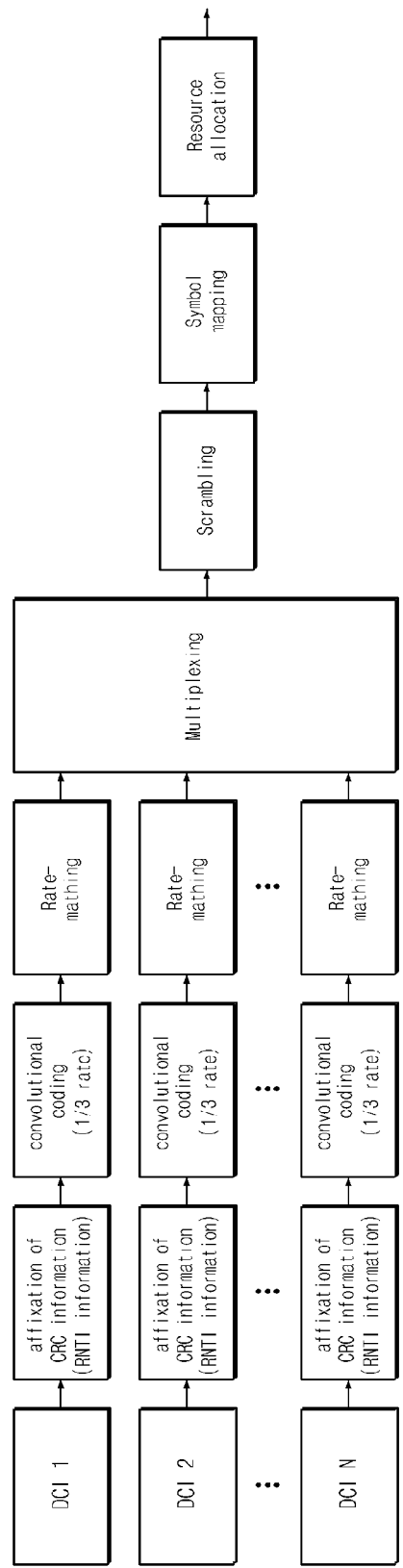
FIG. 2 is a block diagram illustrating a process in which DCI in a binary number form is modulated into a PDCCH in a complex number form within LTE downlink signals.
Figure 3:
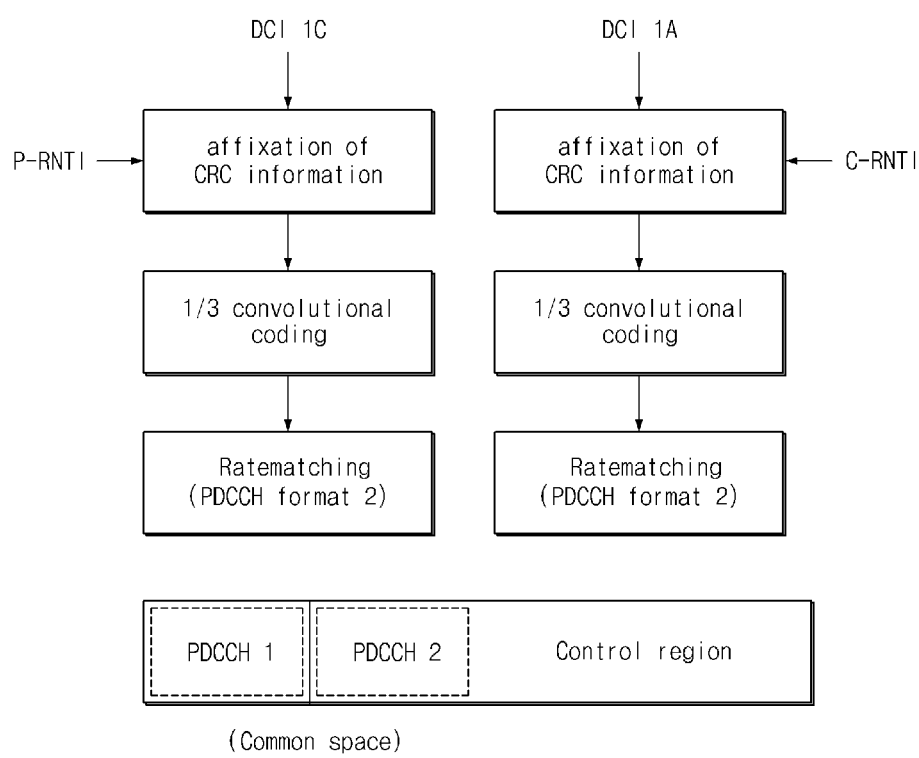
FIG. 3 is a block diagram illustrating a process in which PDCCHs are assigned to a common space.
Figure 5:
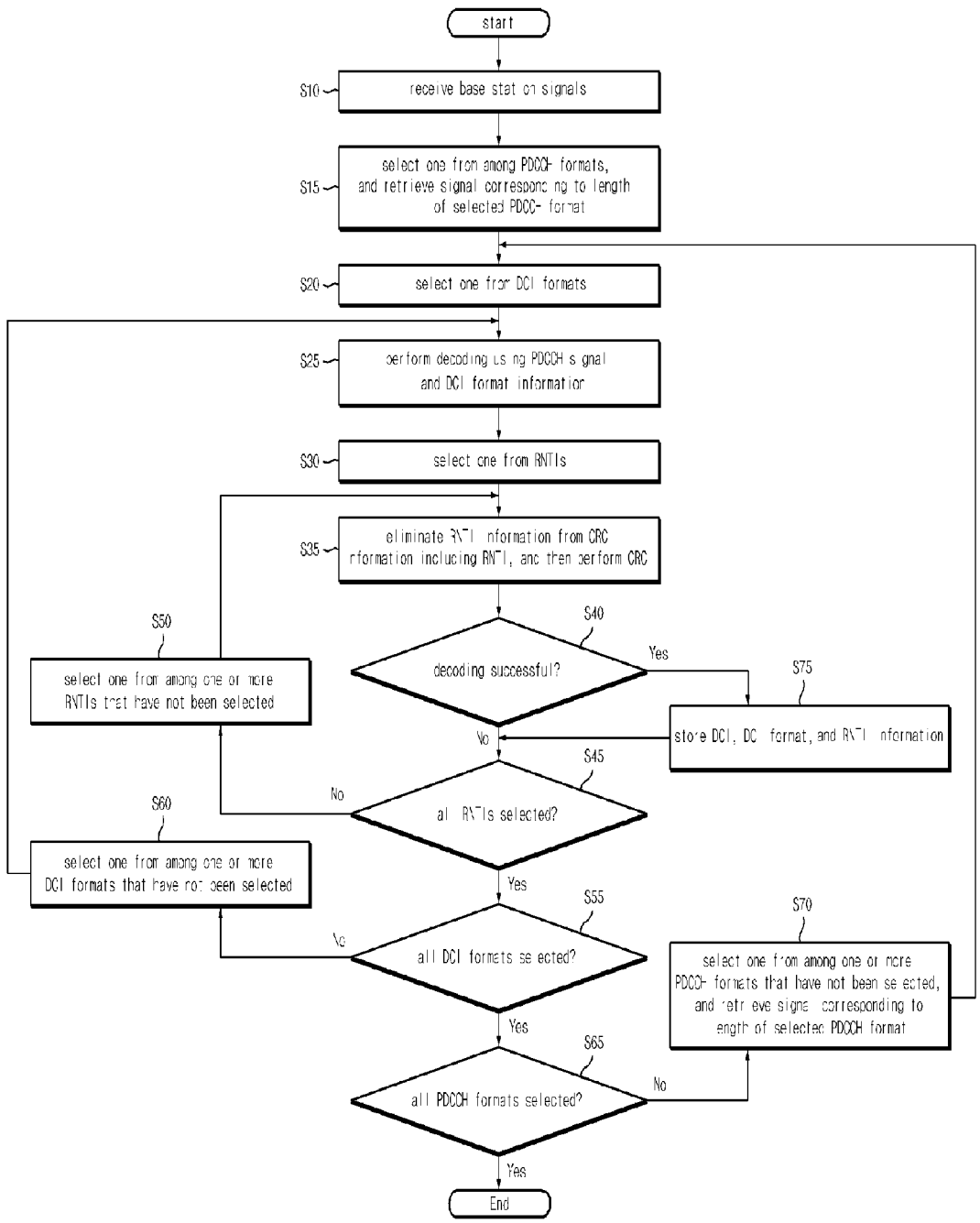
FIG. 5 is a flowchart illustrating a conventional method of detecting a PDCCH in an LTE system.

After the PDCCH has been detected in the common space as described above, it is assumed that a PDCCH has been allocated to the UE-specific space, and the above-described process illustrated in FIG. 5 is performed.

In the above-described method of detecting a PDCCH in an LTE system in accordance with the present invention, at least in the common space, three types of RNTI information can be tested by performing a single test on DCI format 0, six types of RNTI information can be tested by performing a single test on DCI format 1A, and four types of RNTI information can be tested by performing a single test on DCI format 1C. In the same manner, two types of RNTI information can be tested by performing a single test on DCI format 3, and two types of RNTI information can be tested by performing a single test on DCI format 3A. Accordingly, a total of 17 combinations of DCI formats and RNTIs can be tested by performing a total of five tests. As a result, since six tests are performed for each of the combinations, as illustrated in FIG. 4, only a total of 30 (=5×6) tests are required, and accordingly computational load can be significantly reduced compared to the conventional method, with the result that DCI can be detected more rapidly.

The method of detecting a PDCCH in an LTE system in accordance with the present invention is not limited to the above-described embodiment, but may be varied and modified in various ways within the range that falls within the technical spirit of the present invention. For example, the method in accordance with the present invention may be applied to an LTE Advanced (LTE-A) system that has been evolved from an LTE system without changes. It is noted that an LTE system in the following claims also includes an LTE-A system.

As described above, the present invention provides a method of detecting a PDCCH in an LTE system that is capable of reducing computational load that is required to detect downlink control information (DCI) from a PDCCH allocated to a common space when detecting the DCI at a receiving end, thereby enabling overall DCI to be rapidly detected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of detecting a physical downlink control channel (PDCCH) in a long-term evolution (LTE) system, comprising the steps of:
    (a) selecting one from among possible PDCCH formats for received base station signals, and retrieving a signal corresponding to a length of the selected PDCCH format;
    (b) selecting one from among one or more of possible downlink control information (DCI) formats that have not been selected yet;
    (c) performing decoding using the signal retrieved at step (a) and the DCI format selected at step (b);
    (d) obtaining a remainder by dividing the signal decoded at step (c) by a cyclic redundancy check (CRC) pattern, and storing the remainder as radio network temporary identifier (RNTI) information, together with the selected DCI and the DCI format; and
    (e) repeating steps (b) to (d) until all of the possible DCI formats have been selected.

2. The method of claim 1, further comprising the step of:
    (f) repeating steps (a) to (f) until all of the possible PDCCH formats have been selected.

3. The method of claim 1, wherein the PDCCH is a PDCCH that has been allocated to a common space.

4. The method of claim 2, wherein the PDCCH is a PDCCH that has been allocated to a common space.

5. The method of claim 1, wherein the PDCCH is a PDCCH that has been allocated to a common space.

* * * * *